United States Patent
Keppel et al.

(10) Patent No.: US 6,415,379 B1
(45) Date of Patent: Jul. 2, 2002

(54) METHOD AND APPARATUS FOR MAINTAINING CONTEXT WHILE EXECUTING TRANSLATED INSTRUCTIONS

(75) Inventors: David Keppel, Seattle, WA (US); Robert Cmelik, Sunnyvale; Robert Bedichek, Palo Alto, both of CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 09/417,981

(22) Filed: Oct. 13, 1999

(51) Int. Cl.[7] .......................... G06F 9/455; G06F 9/45; G06F 9/52

(52) U.S. Cl. .................. 712/209; 712/227; 712/228; 703/26; 711/205; 711/202; 711/206

(58) Field of Search ........................ 711/202, 141, 711/205, 143, 207, 145, 209, 206; 712/209, 227, 228, 23, 24, 27, 217, 248; 703/23, 26, 20, 27, 28, 24

(56) References Cited

U.S. PATENT DOCUMENTS

| 4,951,195 A | * | 8/1990 | Fogg, Jr. et al. ............... 703/20 |
| 5,926,832 A | * | 7/1999 | Wing et al. .................... 703/23 |

* cited by examiner

Primary Examiner—Daniel H. Pan
(74) Attorney, Agent, or Firm—Stephen L. King

(57) ABSTRACT

A method of maintaining translation context for instructions translated from instructions designed for a target microprocessor to run on a host microprocessor including storing translation context related to each translated host instruction, indicating a translation context for host instructions presently being executed by the host processor, comparing translation context stored for a next host instruction with the translation context for a host instruction presently being executed, executing the next host instruction if the translation context of the next host instruction and the presently executing host instruction compare, and searching for an instruction with translation context which compares to the translation context of the host instruction presently executing if the translation context of the next host instruction and the presently executing host instruction do not compare.

12 Claims, 2 Drawing Sheets

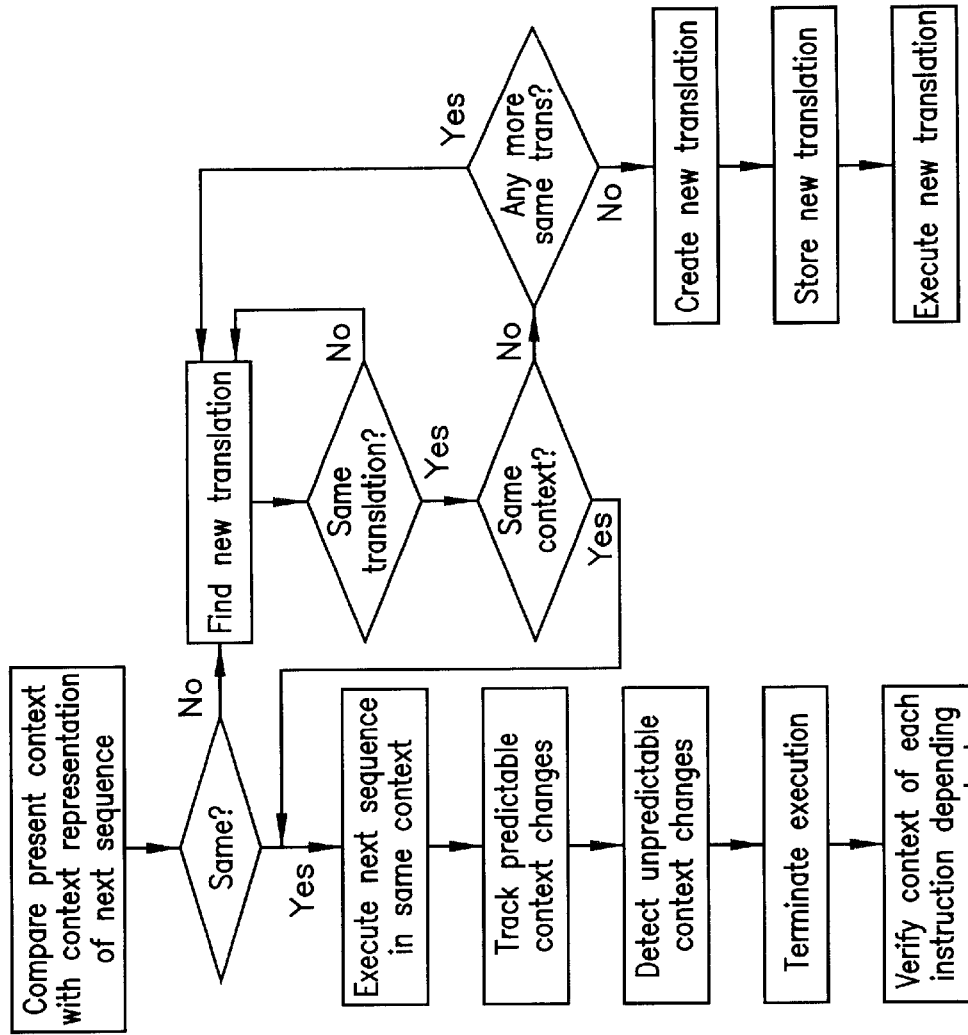
Fig. 3
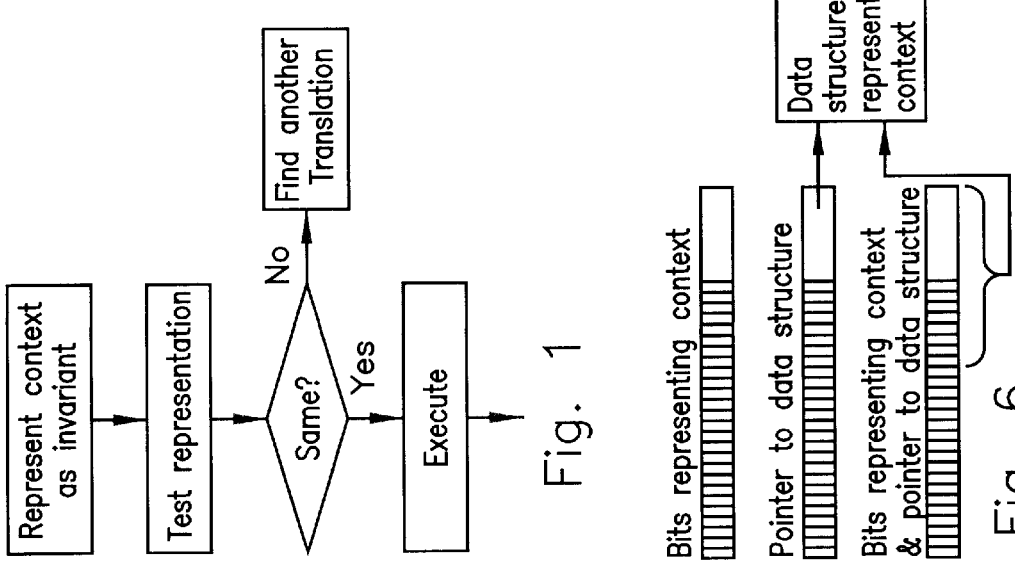
Fig. 1
Fig. 6

METHOD AND APPARATUS FOR MAINTAINING CONTEXT WHILE EXECUTING TRANSLATED INSTRUCTIONS

BACKGROUND OF THE INVENTION

1. Field of the Invention

This invention relates to computer systems and, more particularly, to apparatus and a method for improving the performance of a microprocessor in executing programs translated from programs designed for execution by a different processor.

2. History of the Prior Art

Recently, a new microprocessor was developed which combines a simple but fast host processor (called a "morph host") and software (referred to as "code morphing software") to execute application programs designed for a target processor having an instruction set different than that of the morph host processor. The morph host processor executes the code morphing software which translates the target application programs dynamically into host processor instructions able to accomplish the purpose of the target application programs. As the instructions are translated, they are stored in a translation buffer where they may be accessed without further translation. Although the initial translation of a program is slow, once translated, many of the steps normally required for hardware to execute a program are eliminated. The new microprocessor has demonstrated that a simple fast processor designed to expend little power is able to execute translated "target" instructions at a rate equivalent to that of the "target" processor for which the programs were designed.

Complicating the problem of translation are the various interruptions and exceptions which are carried out by the hardware of a target computer and its operating system in order for the computer system to operate. When a target exception is taken during the operation of a target computer, state of the computer at the time of the exception must be saved typically by calling a microcode sequence to accomplish the operation, the correct exception handler must be retrieved, the exception must be handled, then the correct point in the program must be found for continuing with the program. Often this requires that the program revert to the state of the target computer at the point the exception was taken. The results provided by the hardware and software of the target computer to accomplish these operations must somehow be provided by the process of translation so that the morph host processor is able to correctly respond to these exceptions.

In order to be able to run programs designed for other processors at a rapid rate, the morph host processor includes a number of hardware enhancements. One of these enhancements is a gated store buffer which stores temporarily memory stores resulting from the execution of the translated sequence of instructions in the translation buffer. A second enhancement is a set of host registers (in addition to normal working registers) which store state of the target processor at the beginning of any sequence of target instructions being translated. Sequences of target instructions are translated into host instructions and executed. The sequences begin and end at points at which target state is known. If the translated instructions execute without raising an exception, the memory stores generated by the execution of the translated host instructions are stored in memory (committed to memory) by a commit instruction; and the registers holding the target state are updated to the target state at the point at which the sequence completed.

However, if an exception occurs during the execution of the sequence of host instructions, processing stops; and the entire operation may be returned to the beginning of the sequence of target instructions at which known state of the target processor exists. This allows rapid and accurate handling of exceptions incurred while dynamically translating and executing instructions.

It will be noted that the method by which the new microprocessor handles the execution of translations by placing the effects generated by execution in temporary storage until execution of the translation has been completed is effectively a rapid method of speculating. The new microprocessor, in fact, uses the same circuitry for speculating on the outcome of other operations. For example, by temporarily holding the results of execution of instructions reordered by a software scheduler from naively translated instructions, more aggressive reordering may be accomplished than has been attempted by the prior art. When such a reordered sequence of instructions executes to produce a correct result, the memory stores resulting from execution of the reordered sequence may be committed to memory and target state may be updated. If the reordered sequence generates an exception while executing, then the state of the processor may be rolled back to target state at the beginning of the sequence and a more conservative approach taken in executing the sequence.

One of the most advantageous features of the new microprocessor is its ability to link together long sequences of translated instructions. Once short sequences of target instructions have been translated and found to execute without exception, it is possible to link large numbers of these short sequences together to form long sequences of instructions. This allows a translated program to be executed at great speed because the microprocessor need not go through all of the steps (such as looking up each of the shorter translated sequences) normally taken by hardware processors to execute instructions. Even more speed may be attained than might be expected because, once long sequences are linked, it is often possible for an optimizer to eliminate many of the steps from the long sequences without changing the results produced. Hardware optimizers have never been able to optimize sequences of instructions long enough to allow the patterns which allow significant optimization to become apparent.

Whenever a processor is executing instructions, it is running in some particular mode which has various characteristics. The instructions of an application must be executed in the correct mode to consistently produce the correct results. These characteristics of a mode are effectively background for the instructions and may be considered to be a part of the instructions. As a processor executes instructions, certain of those instructions may change the characteristics and thus the mode of operation. This requires that a number of characteristics of the microprocessor be set differently to handle these different modes. The characteristics of machine state which must be set correctly in order for instructions to provide the correct result are typically referred to as the context in which the instructions execute. Context may be said to summarize the current state of the machine that is necessary to produce the correct result from the execution of instructions.

A major problem which the new microprocessor faces in translating sequences of instructions designed for a target processor having a first instruction set into a sequence of host instructions of a different instruction set is caused by the need to maintain context while translating and running.

There are a myriad of different things which can constitute context in executing a program. The recitation of just a few of the many elements which can constitute context illustrates just how complicated the problem is. Those skilled in the art will understand that there are literally hundreds of possible items of context.

Many microprocessors are designed to function with application programs having instructions of eight bit, sixteen bit, and thirty-two bit words lengths depending on the capability of the operating system in use. Often the same instructions are utilized with applications written with instructions of different word lengths. However, if the microprocessor attempts to execute sixteen bit instructions while its characteristics are set for executing thirty-two bit instructions, the instructions will probably not execute correctly. Thus, instruction word length can be considered as target processor context for execution purposes.

As another example, instructions execute at different levels of permission. Thus, some instructions can only be executed by one having the highest level of access; other instructions may be executed by users at a lower level as well as all those at a higher level. It is necessary to maintain the same access levels when executing translated instructions so that applications cannot interfere with assets of unrelated applications.

Intel X86 based microprocessors allow applications to designate where the various portions (segments) of code and data are stored in memory. For example, a program may designate base addresses and lengths for segments of the program so that a code segment starts at one base address and continues through some amount of memory while a data segment starts at a different base address and includes a different amount of memory. Alternatively, a program may designate a single flat segment to be used for storing all instructions, data, and other elements of the program. Further, all segments for one program may start at the same base address yet run to different ending addresses. Consequently, the arrangement of base addresses being utilized is a very important characteristic in executing instructions. A confusion in the areas of memory allotted for different uses will probably keep a program from executing instructions with the proper results. Thus, this may be an important element of context.

If an application is designed to execute with paging enabled, then the application must allow for paging exceptions which may occur. If an application is designed with paging off, then no paging exceptions can occur. Paging may thus be an important element of context.

There are many other characteristics that must be the same whenever the instructions are executed as when the instructions were compiled for the instructions to produce the correct results. With complicated instruction sets such as those used by Intel X86 processors, the number of characteristics which constitute context is quite large.

As with execution of instructions by the target processor, it is necessary that host instructions translated from target instructions maintain the context of the original processor for which the target instructions were designed when those translated instructions are executed in order for the same results to be produced by the host system. Since those items of context which may effect different results from the instructions need to remain constant from translation to execution, this would seem to require that literally hundreds of elements of context would need to be made a part of each translation in order to assure that the results produced be correct.

While it is critical when executing instructions on a processor to produce correct results, it is also desirable to execute instructions as rapidly as possible. This is generally accomplished by producing code which runs as efficiently as possible. The context or machine state controls just how efficient the code may be made. There are many characteristics of the machine state in which instructions execute which affect the efficiency of translation and execution and may make the instructions run faster or have some other desirable effect on the execution. In all cases, it is important that instructions which are executed in a particular mode on the target microprocessor be executed in an environment having characteristics set to execute instructions in the same mode in the host system. Furthermore, it is important that the translation context in which optimizing translation of the target code is carried out be maintained when that optimized code is executed.

Consequently, it is desirable to provide apparatus and methods by which a microprocessor which executes instructions translated from instructions designed for a target processor having a different instruction set can maintain context of the target processor so that execution of the translated instructions provides correct results.

It is equally desirable that the speed secured through the dynamic translation and optimizing practiced by the new microprocessor be maintained in the process of assuring that the translation is executed in the same context as that for which it was originally designed.

SUMMARY OF THE INVENTION

It is therefore an object of the present invention to assure that the translated instructions are executed in the same translation context as that in which they were originally translated and to do this, whenever possible, without slowing execution of the translated instructions.

This and other objects of the present invention are accomplished by a method which maintains the translation context for each portion of translated instructions, compares the translation context in which the morph host is functioning whenever a new portion of translated instructions is to be executed with the translation context at translation of the portion of translated instructions, allows execution if the translation contexts are the same, and forces a search for a different translation or a retranslation of the original instructions from which the portion of translated instructions was derived if the translation contexts differ.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 a flow chart illustrating a method in accordance with the invention.

FIG. 3 is a flow chart illustrating a method of practicing the invention.

FIG. 6 is a diagram illustrating representations of context in accordance with the present invention.

DETAILED DESCRIPTION

Figure 2:
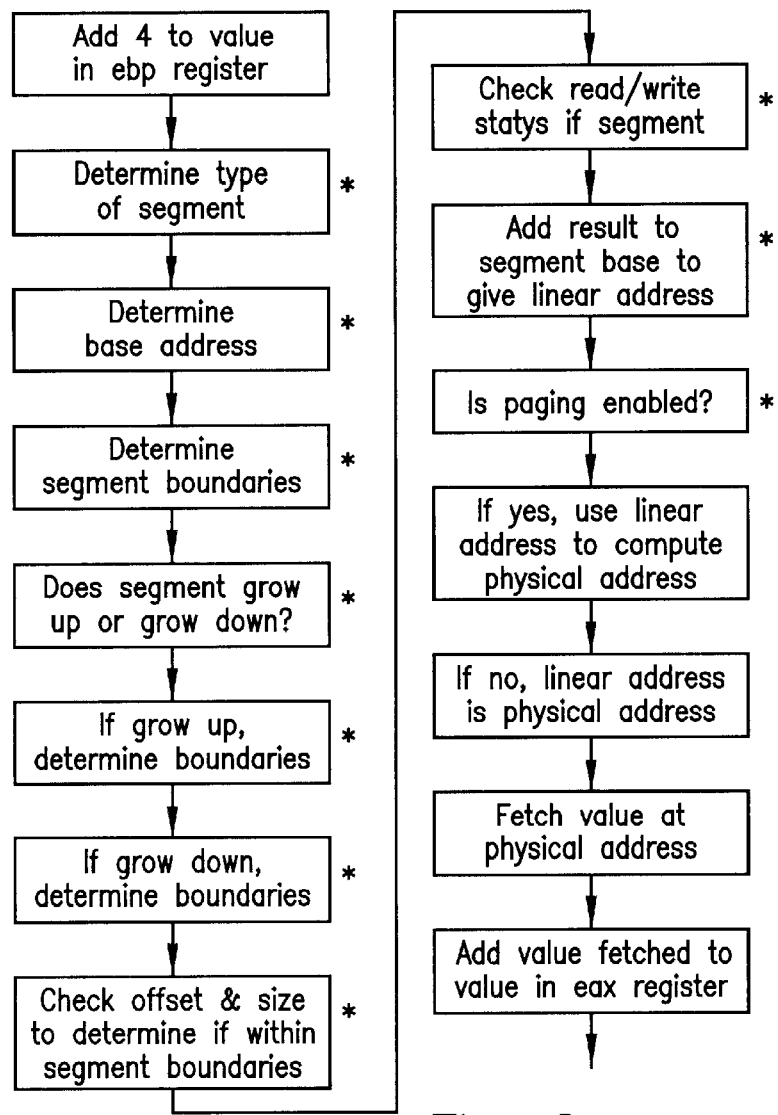
FIG. 2 is a diagram illustrating the steps necessary to carry out one particular instruction.

As has been described in some detail above, the new microprocessor executes code morphing software which translates sequences of target instructions into sequences of host instructions, stores those sequences of translated instructions in a translation buffer for reuse, attempts to execute those sequences of translated instructions, updates state and memory when translated sequences execute to produce a correct result, and discards the effects of attempted execution of sequences of translated instructions which do not execute to produce a correct result. The stored sequences of translated instructions may be optimized and often linked to one another to produce long sequences of translated instructions. These long sequences may be further optimized to reduce their length and increase their efficiency of execution so that the new processor may often execute operations much faster than the original translations.

In order for a sequence of translated instructions to produce the result produced by the original target instructions, the new processor must decode each of the target instructions correctly. This means that the new processor must assure that the translated instructions include all of the context of the original instructions so that the meaning of those original instructions is completely translated. For example, a translation must be able to determine information defining the segment type, its base address, and extent so that proper memory accesses may be executed. A translation must be able to determine whether paging is enabled during execution to know how addresses are computed and whether page exceptions should be accepted. A translation must be able to determine all other elements of context which allow the result accomplished by the target sequence from which it was translated to be accomplished when the translated sequence is executed by the host processor.

For example, an instruction such as the following for a X86 processor:

add $eax, 4($ebp);

commands an X86 processor to add four to the value in the "ebp" register to determine a segment offset. This segment offset is checked to determine whether it lies within the segment boundaries for the memory segment being accessed (the stack segment). In addition, the X86 processor checks whether the instruction is allowed to read and/or write the memory segment being accessed; and, finally, the segment offset is added to the segment base to produce a linear address, which is in turn used to determine the physical address of the memory position accessed by the instruction. The physical address is then used to fetch the value stored in the memory position and to add the memory value to the value in the "eax" register.

However, in addition to these elements of the instruction, there are a large number of implied elements. For example, the use of the "ebp" register here implies the use of the stack segment. The use of a different register might imply the use of a different segment.

X86 segments can "grow up" or "grow down." Stack segments frequently grow down while other segments usually grow up. The determination of whether a segment offset is valid for a particular segment depends on whether the segment being accessed grows up or grows down. For a grow-up segment, the valid offsets range from 0 to the segment limit. For a grow-down segment, the valid offsets range from the segment limit to the largest possible offset ($2^{16}-1$) for 16 bit segments and ($2^{32}-1$) for 32 bit segments.

When the linear address has been computed, a determination is made whether paging is enabled. If not, the linear address is the physical address of the memory data; if paging is enabled, then the physical address must be computed. In either case, the limits of the memory segment must be tested to determine whether the address is legal; and finally the data is accessed and added to the value in the eax register.

Thus, for this simple instruction, the knowledge that the ebp register is a stack register, the base address of the stack in memory, the range of valid offsets for the segment depending on whether the segment grows up or down, whether paging is enabled, the type of memory segment being addressed, and its base address are all characteristics which constitute context and must be known for the translated instructions to be able to properly carry out the operation when executed.

In fact, when an interpreter executes a target instruction, it must carry out all of these implicit (i.e., background) steps and checks in order to execute the instruction correctly. The implicit steps and checks must be carried out explicitly at potentially great expense. The same would be true of a naive translation of a target instruction into host instructions.

As those skilled in the art will appreciate, instructions can change the context in which instructions execute by changing one of the characteristics which constitutes a mode of operation. Consequently, the new processor must track instructions and assure that elements of context change within the translated sequence when a target instruction varies the context in which the sequence of translated instructions is to execute. In this way, the context of the translated sequence will be correctly represented for the new processor when the translated sequence completes executing.

Not only should each sequence of translated instructions include the information from which all of the necessary characteristics which constitute context may be determined, whenever any sequence of translated instructions is correctly executed and a next sequence is to be executed, the new processor should ensure that the context in which it is presently operating is the context required for correctly executing the beginning of the next sequence. Thus, the new processor should test the context existing at the end of the first sequence of translated instructions to assure that it is the same as the context required by the next sequence of translated instructions before it can begin executing the next sequence.

In a similar manner, in order to link two sequences of translated instructions together into a single sequence, the new processor should ascertain that the context in which the first sequence finishes executing is the same as the context in which the sequence to which it will be linked will begin executing.

As will be seen, the need to include all of the elements of context in each sequence of translated instructions and check the context of each new sequence before it begins to execute does not produce efficient code.

The present invention overcomes these problems and produces code which executes efficiently at a rate which challenges the rate at which a target processor executes the same code. The present invention relies on the property of locality to generate code which executes more efficiently.

More particularly, in most cases, the instructions which a processor executes in any process or program tend to be executed more than once or to be executed with other instructions most of the time. This has the effect of causing the context to be similar or identical from one sequence of instructions to the next. For example, many elements of context depend on the particular memory segment being accessed; a segment base address and extent, whether the segment grows up or down, and whether the segment is writable or may only be read are all elements which depend on the segment being accessed. These elements are the same if the segment is the same from one sequence to the next. In most cases, a memory segment used for a first sequence is the same as the segment used for a next sequence. Other elements of context also display the characteristic of locality. The property of locality allows the present invention to presume that the context will be the same from sequence to sequence.

The presumption that the context is the same allows the new processor in translating a sequence of instructions to represent the context for a translation to execute properly in some fashion as an invariant. Then, rather than stepping through each of the tests required to determine that the context for the translation is correct, the processor merely checks the representation to determine that the entire context is the same. If it is the same, then the translated sequence may be executed. If it is not the same, then the processor looks for another translation which meets the criteria. If none is found, then a new translation must be generated. The general method is illustrated in the flow chart of FIG. 1.

It will be seen that this use of the property of locality allows a sequence of translated instructions to be reduced by those instructions implied by the elements of context which are being treated as invariants. FIG. 2 illustrates a sequence of operations representing the steps necessary for an interpreter to carry out the steps of the add function described above. As may be seen, at least ten of those steps are steps required by context to be inserted into the sequence to assure that the operation is carried out to give the same result as the add function. Those operations which are marked with an asterisk may be removed from the instruction sequence and represented in some manner at the beginning of the translated sequence. For example, elements of context which might be of one or the other of two states might each be represented by a single bit in some designated position of a first representation of context (e.g., a quad word), while characteristics having a larger number of states might require a larger number of bits in some other designated positions of the quad word.

FIG. 3 is a flow chart illustrating the operation of the new processor upon completing execution of a first sequence of translated instructions and beginning a next sequence. The first step illustrated is a test of the context of the next sequence of instructions. The new processor looks at its present representation of context (the context at which the machine was operating when the first sequence completed) and compares that context to the representation of the context of the next sequence. If the context is entirely the same, the next sequence of translated instructions is executed in the same context as the prior sequence. This eliminates all of the steps required in an earlier sequence to determine if the context was correct. Rather than executing the steps of FIG. 2 marked by an asterisk, the new processor assumes that each condition is met and executes the following steps accordingly.

If the entire context is not the same, the next sequence of instructions is not executed. Instead, the new processor searches for another sequence of translated instructions which meets the criteria for the next sequence. Typically, this will be another translation of the same sequence of target instructions having however the same context representation as the context representation of the sequence last executed. It is possible that such a sequence does not exist. If so, the new processor executes the code morphing software to create such a translation and stores the translation in the translation buffer with its context representation for further use.

In order to assure that the context in which a sequence of translated instructions execute is correct, it is necessary for the code morphing software to track predictable changes of context and to change the representation of context to a correct representation when any change occurs. In this manner, the context in which the host processor is presently executing will be correctly represented when a test of context of a next sequence is accomplished.

It is also important for the code morphing software to detect an instruction which unpredictably changes the context. For example, if an instruction loads a new segment register, then all of the criteria which may vary with a segment may change. After loading the segment register, there is a new context in effect; and the new context should be used for execution of instructions from that point on in the sequence. S Any subsequent instruction that depends on the affected portions of the context (e.g., any instruction that accesses the loaded segment register) cannot be executed without verifying that the new context is appropriate. The code morphing software can terminate the translation at any point between the two and/or arrange for the context to be verified between the point where it is modified and the point where the subsequent instruction depends on the updated value.

Because significant acceleration in execution is obtained by linking different translated sequences together so that they function as a single longer sequence, the use of the linking process is quite desirable. As will be understood, when two sequences are to be linked, it is necessary that each portion of the longer sequence execute correctly. Consequently, it is necessary that the context be appropriate for each of the portions of the longer sequence to execute correctly. This may be accomplished in one embodiment of the invention by linking a first translated sequence to a second through the use of the address of the second translated sequence. In the new processor, the address is typically held in a program control unit. When one sequence is to be linked to another, the first sequence ends by pointing to the address in the program control. When the second sequence is entered, the translation checks the representation of context to assure that it is the same as the context required by the second sequence.

Figure 4:
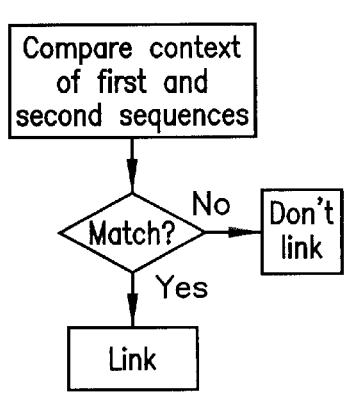
FIG. 4 is a flow chart illustrating a portion of the method of the present invention.

Testing the context of the host against the representation of context required by the second sequence for each linked sequence takes some number of operation cycles. Consequently, a more advanced embodiment of the invention removes the context test from the translation and places it in the original linking process as illustrated in FIG. 4. That is, when a determination is first made that two sequences are to be linked, the context in which the first sequence is executing as it ends is compared to the context in which the second sequence begins executing by comparing the representations of context for each. If the context representations are the same, the link is accomplished. Thereafter, when the longer sequence is executed, it is no longer necessary to test for context at the point at which the two sequences are linked. The end of the first sequence merely points to the address of the second sequence and the link is accomplished. The execution of instructions is accelerated by checking context only at the time of the original linking rather than each time the linked sequences are executed.

Figure 5:
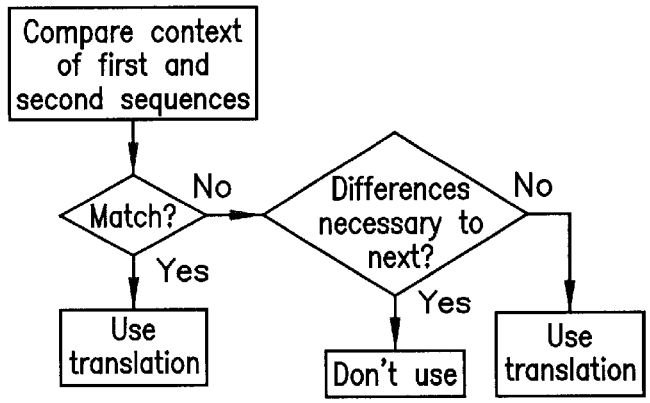
FIG. 5 is a flow chart illustrating another portion of the method of the present invention.

In a similar manner, whenever a search for a translation is conducted, one embodiment looks for both a particular translation and for a particular context. In this manner, the check of machine operating context to the required translation context is completely removed from the translated sequences and placed in the dispatch function of the code morphing software as illustrated in FIG. 5. The dispatch function essentially looks for a next sequence of translated instructions to execute by searching the translation buffer for a correct translation and a correct context whenever either a next translation is needed or a proposed linking is to be accomplished.

The present invention provides extensions to further increase the speed of execution of instructions. One extension provided by the present invention allows linking to occur in cases in which an instruction changes context unpredictably. The operation allows a link to the address held by the program controller followed by a test of the new context against the present context. If the representations of the contexts are the same, then the link may be continued.

Another extension (also shown in FIG. 5) depends on the fact that it is not always necessary for a new translated sequence to have context identical to the present context in which the host is executing in order to produce a correct result. Some translated sequences depend on fewer elements of context or less limiting elements of context than that in which the host is executing. Such sequences may be executed and linked to previous sequences so long as that context necessary for correct execution of the yet-to-be-executed sequence is present. This may be tested by comparing the representation of the context of a translated sequence to be executed with the representation of present context of the host to determine those elements of context which differ. Then the elements which differ are reviewed to determine whether they are necessary to the sequence to be executed and, if necessary, whether the difference is that they are less restrictive in the sequence to be executed. If the context elements are not needed or are less restrictive, then the sequence may be executed or linked.

The manner of representing context may vary across a wide spectrum as is shown in FIG. 6. For example, if all of the context elements when concatenated together take up no more bits than are readily available in a machine register (e.g., 32 or 64 bits), the context can then be represented by such concatenation; and the tests can be easily accomplished by performing simple bit operations on the representations (e.g., XOR and AND). Alternatively, where the number and size of the elements in the context exceed the number of bits readily available in a register, the context elements may be stored in a data structure in memory; and the pointers into the data structure can be used to compare for exact context matches. The pointers are then the representation of the context. More involved comparisons (not exact matches) depending on the individual elements of context would have to access the data structures in memory.

Another method of representing context is a hybrid of these two techniques. Some of the elements can be directly represented, while others are stored in memory. The remainder of the representation is a pointer/index to the data structure in memory. Again, exact comparisons are straightforward, while element-dependent comparisons would be more involved.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of maintaining translation context for instructions translated from instructions designed for a target microprocessor to run on a host microprocessor comprising the steps of:

storing translation context related to each translated host instruction, indicating a translation context for host instructions presently being executed by the host processor, comparing translation context stored for a next host instruction with the translation context for a host instruction presently being executed, executing the next host instruction if the translation context of the next host instruction and the presently executing host instruction compare, and searching for an instruction with translation context which compares to the translation context of the host instruction presently executing if the translation context of the next host instruction and the presently executing host instruction do not compare.

2. A method as claimed in claim 1 in which the step of storing translation context related to each translated host instruction comprises storing a representation of translation context as a part of translated host instructions.

3. A method as claimed in claim 2 in which the representation is a pointer to an address at which translation context is stored.

4. A method as claimed in claim 2 in which the representation is a set of bits indicating translation context.

5. A method as claimed in claim 2 in which the representation is a set of bits indicating translation context and a pointer to an address at which additional translation context is stored.

6. A method as claimed in claim 1 in which the step of storing translation context related to each translated host instruction comprises storing a representation of translation context apart from translated host instructions.

7. A method as claimed in claim 1 in which the step of comparing translation context stored for a next host instruction with the translation context for a host instruction presently being executed is accomplished when a translation is accessed.

8. A method as claimed in claim 1 comprising the further step of linking a first sequence of translated host instructions to a succeeding sequence of translated host instructions if the translation context of the first sequence of translated host instructions and the translation context of the succeeding translated host instructions compare.

9. A method as claimed in claim 8 in which the step of comparing translation context stored for a next host instruction with the translation context for a host instruction presently being executed is accomplished when a first translation sequence is linked to a succeeding translation sequence.

10. A method as claimed in claim 1 comprising the further step of linking a first translated host instruction to a succeeding translated host instruction if the translation context of the first translated host instruction affecting the succeeding translated host instruction and the translation context of the succeeding translated host instruction compare.

11. A method which comprises maintaining translation context for each portion of translated instructions, comparing the translation context in which a morph host processor is functioning whenever a new portion of translated instructions is to be executed with the translation context at translation of the portion, allowing execution if the translation contexts necessary for correct execution of the new portion are the same, and forcing a search for a different translation if the translation contexts necessary for correct execution of the new portion differ.

12. A method which comprises maintaining translation context for each portion of translated instructions, comparing the translation context in which a morph host processor is functioning whenever a new portion of translated instructions is to be executed with the translation context at translation of the portion, allowing execution if the translation contexts are the same, and forcing a search for a different translation if the translation contexts differ including retranslating the original instruction from which the portion of translated instructions was derived.

* * * * *